(12) United States Patent  
Gossner

(10) Patent No.: US 8,820,176 B2  
(45) Date of Patent: Sep. 2, 2014

(54) VORTEX FLOW METER HAVING AN INERTIAL SENSOR FOR DETECTING PARASITIC OSCILLATIONS

(75) Inventor: Kai Gossner, Neurkirchen-Vluyn (DE)

(73) Assignee: KROHNE Messtechnik GmbH, Duisburg (DE)

( * ) Notice: Subject to any disclaimer, the term of this patent is extended or adjusted under 35 U.S.C. 154(b) by 397 days.

(21) Appl. No.: 13/219,949

(22) Filed: Aug. 29, 2011

(65) Prior Publication Data

US 2012/0192657 A1 Aug. 2, 2012

(30) Foreign Application Priority Data

Jan. 31, 2011 (DE) .......................... 10 2011 009 894

(51) Int. Cl.
*G01F 1/32* (2006.01)
(52) U.S. Cl.
CPC ...................................... *G01F 1/329* (2013.01)
USPC ....................................................... 73/861.22
(58) Field of Classification Search
None
See application file for complete search history.

(56) References Cited

U.S. PATENT DOCUMENTS

| | | | |
|---|---|---|---|
| 4,432,242 A | 2/1984 | Thompson et al. | |
| 4,850,218 A | 7/1989 | Tutumi | |
| 5,218,871 A * | 6/1993 | Cody et al. | 73/861.04 |
| 5,247,838 A | 9/1993 | Vander Heyden et al. | |
| 5,828,567 A | 10/1998 | Eryurek et al. | |
| 5,869,772 A * | 2/1999 | Storer | 73/861.24 |
| 5,956,663 A | 9/1999 | Eryurek | |
| 6,434,504 B1 | 8/2002 | Eryurek et al. | |
| 6,449,574 B1 | 9/2002 | Eryurek et al. | |
| 6,601,005 B1 | 7/2003 | Eryurek et al. | |
| 7,010,459 B2 | 3/2006 | Eryurek et al. | |

FOREIGN PATENT DOCUMENTS

| | | |
|---|---|---|
| DE | 141 352 A1 | 4/1980 |
| DE | 201 197 A1 | 7/1983 |
| DE | 60 2004 008 910 T2 | 7/2008 |
| JP | 3-277922 A | 12/1991 |
| JP | 2001-289677 A | 10/2001 |
| JP | 2011-106989 A | 6/2011 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

Vortex flowmeter (1) having a measuring tube (2), a housing (3), a bluff body (4) and a sensor unit (6), wherein the sensor unit (6) serves to detect a vortex measuring signal caused by the bluff body (4). A vortex flowmeter (1) with which the quality of the measuring results is increased is implemented in that, additionally, at least one inertial sensor (7) is provided for detecting parasitic oscillations acting on the vortex flowmeter (1). In accordance with a method, parasitic oscillations acting on a vortex measuring signal of the vortex flowmeter are identified by evaluating a measuring signal of the inertial sensor and a vortex measuring signal of the sensor device is processed at least partially controlled by the evaluated measuring signal of the inertial sensor.

13 Claims, 7 Drawing Sheets

VORTEX FLOW METER HAVING AN INERTIAL SENSOR FOR DETECTING PARASITIC OSCILLATIONS

BACKGROUND OF THE INVENTION

1. Field of the Invention

The invention relates to a vortex flowmeter having a measuring tube, a housing, a bluff body (i.e., A body having a broad, flattened front) and a sensor unit, wherein the sensor unit serves to detect a vortex measuring signal caused by the bluff body. Furthermore, the invention relates to a method for operating a vortex flowmeter having a sensor unit and at last one inertial sensor.

2. Description of Related Art

Vortex flowmeter have been known for a long time, wherein the measurement principle is based on the fact that a vortex street can be formed in a liquid or gaseous medium behind a bluff body that the medium flows around, the vortex street being formed by the vortex moving with the flow, displaced by the bluff body. The frequency, with which the vortex is displaced by the bluff body, is dependent on the flow rate, wherein this correlation is nearly linear under certain circumstances. At any rate, the measurement of the vortex frequency represents a suitable means for determining the flow rate of the medium, which is indirectly why—under additional consideration of, for example, pressure and temperature—a determination of the measuring flow is possible using the vortex frequency measurement. The vortex of the medium occurring in a vortex street leads to local pressure fluctuations, which can be detected by the sensor unit—usually a pressure sensor.

Since the determination of the flow rate in vortex flowmeters is based on the measurement of pressure fluctuations, the vortex flowmeter is sensitive to vibrations in the complete system, which can, thus, influence the quality of the measurement results.

SUMMARY OF THE INVENTION

Based on the above prior art, a primary object of the present invention is to provide a vortex flowmeter and a method for operating a vortex flowmeter, with which the quality of the measurement results can be increased.

The above object is met with a vortex flowmeter of the type in discussion, in that additionally at least one inertial sensor is provided for detecting parasitic oscillations acting on the vortex flowmeter. Inertial sensors are normally microelectromechanical systems and consist of angular velocity, acceleration and magnetic sensors. They use the inertia and/or terrestrial magnetic field for the measurement of movements, orientation and location. By combining multiple inertial sensors in one inertial measurement unit, the accelerations in the six freedoms of movement (translation in and rotation around three spatial axes) can be measured. When an inertial sensor is being discussed in the following, then what is meant is always both a single inertial sensor for detecting a single degree of freedom of movement and a combination of different inertial sensors of an inertial measuring unit for detecting multiple degrees of freedom of movement. The sensor unit of the vortex flowmeter, which acts to detect the vortex measuring signal, is also called pickup.

The inertial sensor is advantageously affixed to the vortex flowmeter with an optimum acoustic coupling, so that parasitic oscillations acting on the vortex flowmeter can be detected by the inertial sensor. Preferably, the inertial sensor according to the invention is an acceleration sensor (accelerometer), which is sensitive along one or more, preferably three orthogonal spatial axes.

The parasitic oscillations acting externally on the vortex flowmeter are caused, for example, by pumps, turbines or valves and other flow influences occurring in the piping system. By evaluating the measuring signal of the inertial sensor or the acceleration sensor, the vortex measuring signals of the vortex flowmeter can be corrected and reviewed, so that the quality of the measurement results can be increased.

The production costs for a vortex flowmeter are reduced according to a first design, in that the inertial sensor is provided on a board of the measuring and evaluating electronics provided on a vortex flowmeter. Since the inertial sensor is provided on a board of the measuring and evaluating electronics, it can be affixed and connected preferably using an automated process during production of the board, so that the installation effort for the inertial sensor is kept as low as possible. A board of the measuring and evaluating electronics is normally connected with the housing of the vortex flowmeter, so that oscillations coming from the piping system and acting on the vortex flowmeter can also spread onto the housing and, thus, onto the board and can be detected by the inertial sensor.

In order to advantageously detect the parasitic oscillations acting on the vortex flowmeter, it is provided by a further design that the inertial sensor is attached to the housing. The parasitic oscillations are immediately tapped by a component of the vortex flowmeter in this design and can be used for correcting the vortex measuring signal. The inertial sensor, here, is rigidly connected to the housing, e.g., screwed on or glued. As an alternative to attaching the inertial sensor to the housing, it is provided by a further advantageous design that the inertial sensor is immediately attached to the measuring tube of the vortex flowmeter. The attachment of the inertial sensor directly to the measuring tube makes is possible to detect the parasitic oscillations spreading, inter alia, over the piping system directly on the measuring tube, so that no change of the parasitic oscillations can occur, for example by damping due to individual components.

According to a preferred design of the invention, it is provided that the inertial sensor is only sensitive to certain spatial axes, in particular to those spatial axes, to which the sensor unit of the vortex flowmeter for flow measurement is sensitive. This design is particularly suitable for such vortex flowmeters, in which the sensor or the sensor unit is only sensitive to one single or two spatial axes, so that an evaluation of parasitic oscillations is not necessary in the spatial directions not detected by the vortex sensor unit; the inertial sensor, in particular an acceleration sensor, is then only sensitive to the spatial axis also evaluated for flow measurement.

Depending on the design of the vortex flowmeter, in particular, depending on its housing and measuring tube, according to a further design, it has been shown to be advantageous when a plurality of inertial sensors are attached at different locations on the vortex flowmeter, in particular, wherein each inertial sensor is sensitive to only one certain spatial direction. Due to the design of the vortex flowmeter, it is possible that the parasitic oscillations act in different degrees in the different spatial directions in different areas of the vortex flowmeter, so that, for example, it is advantageous to install an acceleration sensor that especially detects this part of the oscillations, in particular at points where this part of the oscillations acts strongly in one certain spatial direction.

As a result, a vortex flowmeter is possible, for example, with an acceleration sensor sensitive to the x-direction attached to the board of the measuring and evaluating electronics, with an acceleration sensor sensitive, for example, to the y-direction attached to the housing and with a further acceleration sensor sensitive to the z-direction attached on its measuring tube. Of course, many combinations are possible in respect to the choice of spatial direction and the position of the acceleration sensor. Furthermore, it is provided that an inertial sensor is found at each of the three above-mentioned positions, which is sensitive to all three spatial directions, so that the measuring signals of the three inertial sensors can be compared to one another.

According to a further design, it has been shown to be of particular advantage, when at least one inertial sensor is arranged on the piping system surrounding the vortex flowmeter. Such an inertial sensor is, for example, affixed to the piping system with a magnet, however, remains further in contact with the measuring and evaluating electronics of the vortex flowmeter either with a wire or wirelessly.

In this manner, the measuring signals of the inertial sensor arranged externally can still be used for the evaluation of the vortex flowmeter. It is additionally provided that an acceleration sensor sensitive to all three spatial directions is arranged on both sides of the vortex flowmeter at each end of the piping system, so that, for example, the origin of the parasitic oscillations or different parasitic oscillations can be more exactly localized.

The object stated above is also met by a method for operating a vortex flowmeter, in that parasitic oscillations acting on the measuring signal of the vortex flowmeter are recognized during evaluation of the measuring signal of the inertial sensor and that the processing of the vortex measuring signal is controlled at least partially by the evaluated measuring signals of the inertial sensor. The measuring signal of the inertial sensor or the measuring signals of the inertial sensors is/are evaluated using suitable methods in order to recognize the parasitic oscillations acting on the vortex flowmeter. Using the analysis of the measuring signal of the inertial sensor, which is preferably an acceleration sensor, the parasitic oscillations can be assigned to different oscillation categories, namely, on the one hand, into such oscillations that result from short-term influences, for example activating a valve, and, on the other hand, into such oscillations that are long-term and constant, for example those resulting from pumps and turbines working in the piping system.

Depending on the type of parasitic oscillations, the further processing of the vortex measuring signals is controlled based on the evaluated measuring signals of the inertial sensors. For example, the vortex measuring signals that are superimposed with a corresponding parasitic oscillation are discarded or the parasitic oscillations are—at least partially—filtered out by a filter preferably attuned to the parasitic oscillations.

According to a preferred design, it has been shown to be advantageous when the vortex measuring signal is processed in an adaptive filter, wherein the filter parameter is based at least partially on the evaluated measuring signal from the inertial sensor. The processing or post-processing of the vortex measuring signal is consequently dependent on the characteristics of the measuring signal of the inertial sensor. The parameters of the adaptive filter are, consequently, adapted manually or automatically to the type and characteristics of the corresponding parasitic oscillation, so that an advantageous filter performance is always achieved. Completely filtering out the corresponding vortex measuring signal is suitable, for example, for short-term disturbances, while selectively filtering out the corresponding vortex measuring signal is necessary for long-term disturbances.

Parameterization of the filter is preferred when, according to a further design, an amplitude spectrum of the measuring signal of the inertial sensor is formed, wherein filter parameters for the adaptive filter are determined using the amplitude spectrum. Using an amplitude spectrum of the measuring signal recorded by the inertial sensor, for example, the parasitic oscillations of continually operating turbines and pumps can be recognized in the measuring signal. The amplitude spectrum of the measuring signal of the inertial sensor is, for example, calculated with the help of the fast Fourier transform or the discrete Fourier transform. Here, all discrete spectral components in one block are always calculated.

For example, in order to implement an energy and/or memory savings during evaluation, it is possible to refer to an algorithm that is not a block diagram, since, then, the calculating effort is reduced. Here, the complete amplitude spectrum is not calculated in one step, rather the amplitude spectrum is determined step by step, so that a complete amplitude spectrum is present after one complete run-through. For example, the sliding discrete Fourier transform or a sliding Goertzel algorithm is suitable as a calculation algorithm. Single, discrete spectral parts are calculated with the above algorithms, so that the calculation can be carried out frequency selectively. Piping system oscillations often occur in the low frequency range with a frequency of less than 50 Hz.

In this context, it has been shown according to a further design of the method to be particularly advantageous when peaks occurring in the amplitude spectrum are used as a parameter for the adaptive filter. The parameterization of the filter occurs either manually, in that the filter parameters are set by an operator, or automatically by the measuring and evaluating electronics. A bandstop filter, in particular a notch filter, for example, is suitable as a filter for the vortex measuring signal, which filters out the parasitic oscillations—parasitic frequencies—from the vortex measuring signal using the amplitude spectrum, so that these—cleared of the parasitic oscillations—can be passed on.

It should be differentiated here, whether the parasitic frequency lies in the range of the measuring frequencies of the vortex measuring signal or whether the parasitic frequencies lie outside of the frequencies of the measuring signal. Disturbances in the range of the measuring frequencies can also be filtered out, in principle, but there is a risk that the wanted signal, namely the vortex measuring signal, has the same frequency and, thus, is also filtered out—at least partially. As long as the vortex measuring signal and the parasitic oscillations overlap in a very narrow frequency range, for example, a corresponding signal output can be issued.

In order to recognize and classify short-term parasitic oscillations, which are caused, for example, by operating valves, it is provided according to a further design that the measuring signal of the inertial sensor is determined for evaluating the amplitude response and that the amplitude response is differentiated so that sudden changes can be recognized. Preferably, the amplitude response of the measuring signal of the inertial sensor is first determined from the amplitude-modulated measuring signal of the inertial sensor by means of a demodulator, wherein, then, the amplitude response is differentiated according to time, so that a sudden change of the parasitic oscillations can be recognized and evaluated using an evaluation of the differentiated amplitude response. A parasitic oscillation recognized using this evaluation can, for example, lead to the respective vortex measuring signal being discarded by the measuring and evaluating electronics or, respectively, being filtered out by the adaptive filter. The vortex measuring signals are not separated from the parasitic oscillations in this case, but are discarded, since this is only a short-term disturbance of the vortex measuring signal, anyway.

Additionally or alternatively to discarding the vortex measuring signal, it is provided by a further design that a signal output is generated and issued, which indicates that a measurement, for example, is not possible a the moment. The discarding or filtering-out of the vortex measuring signal or, respectively, the issuing of a signal output occurs preferably so long, until the differentiated amplitude signal reaches—preferably exceeds—a pre-determined threshold value.

Furthermore, it is provided according to another design that the measuring signal of the inertial sensor is determined for evaluating the amplitude response and that the average amplitude is determined over a determinable amount of time, in particular a flexible time frame. The amplitude response is, in turn, preferably determined from the amplitude-modulated measuring signal by a demodulator. The determinable amount of time is preferably a flexible time frame, i.e., the constantly progressing amplitude signal is evaluated retrospectively for a same time space in terms of amount and averaged so that a value for the averaged amplitude is obtained. Wherein a significant change of the value of the averaged amplitude in an indication for the presence of a parasitic oscillation.

According to a further design of the invention, it is provided that a signal output is generated and/or the vortex measuring signal is discarded when the averaged amplitude has reached a pre-determined threshold value. The vortex measuring signals are discarded, for example, by the measuring and evaluating electronics or filtered out by the adaptive filter. The optional signal output shows that, for example, it is not possible to measure significant vortex measuring signals at that point in time, since a parasitic oscillation is present. Preferably, the vortex measuring signal is removed or filtered out so long, until the averaged amplitude reaches the pre-determined threshold value.

Preferably, the evaluation of the measuring signal of the inertial sensor occurs simultaneously with at least two of the three above-mentioned evaluation methods, namely, for example, the evaluation of the amplitude spectrum parallel to the evaluation of the differentiated amplitude response or the evaluation of the amplitude spectrum parallel to the evaluation of the averaged amplitude parallel to the evaluation of the differentiated amplitude response. The simultaneous evaluation with all three evaluation methods is particularly preferred.

In detail, there are a plurality of possibilities for designing and further developing the vortex flowmeter according to the invention and the method for operating a vortex flowmeter according to the invention. Here, please refer to the following description of preferred embodiments in conjunction with the accompanying drawings.

DETAILED DESCRIPTION OF THE INVENTION

Figure 1A:
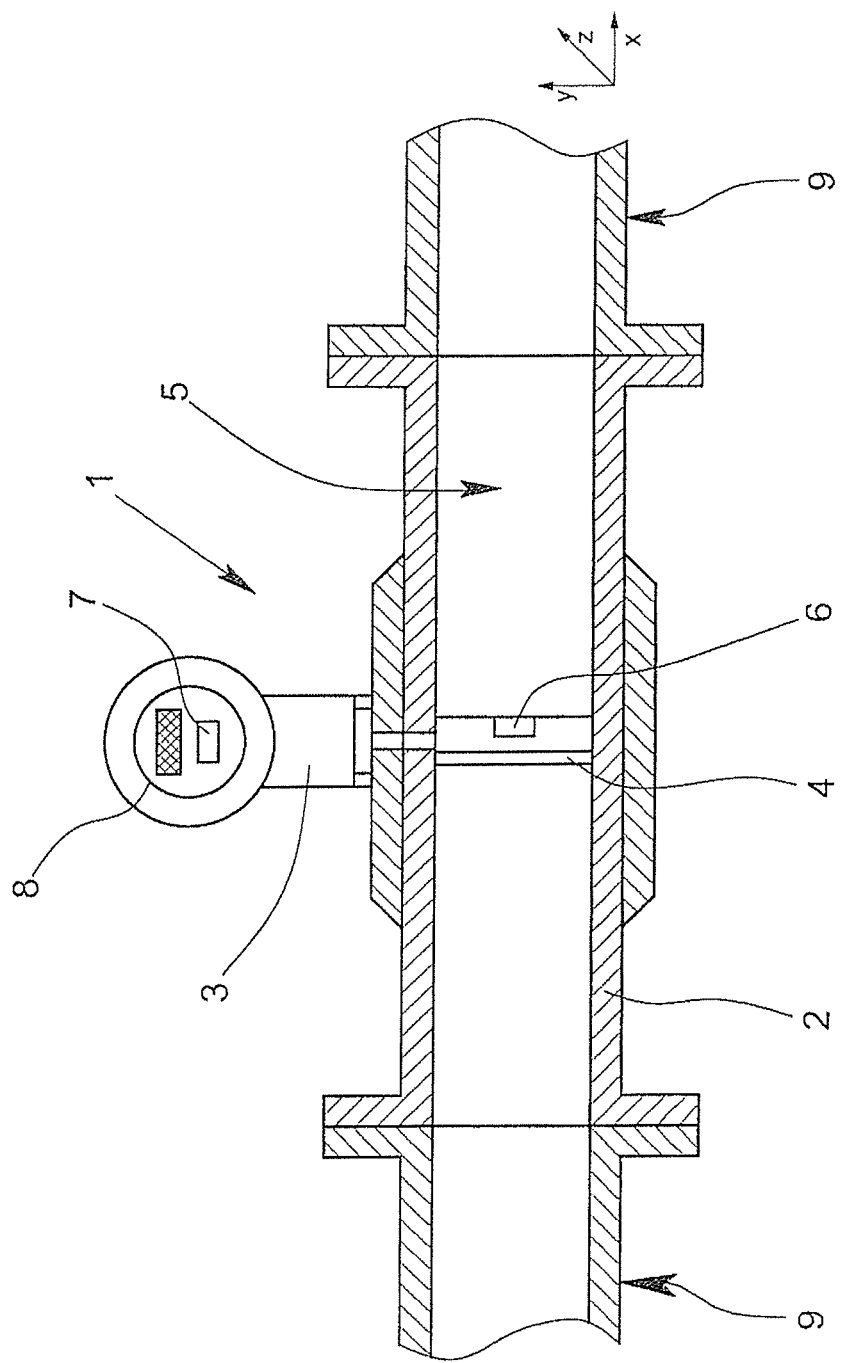
FIGS. 1a-d are sectional views of embodiments of a flowmeter in accordance with the invention.

FIG. 1a to 1d shows a vortex flowmeter 1 with a measuring tube 2 and a housing 3. Within the measuring tube 2, a bluff body 4 is arranged centrally in the flow channel 5 of the measuring tube 2 extending over the entire diameter. The bluff body 4 causes the formation of a vortex at the edges of the bluff body 4 when medium is flowing within the flow channel 5, The frequency of the vortex is detectable using a sensor unit 6 and the vortex measuring signal is formed from the vortex frequency. The sensor unit 6 comprises a piezo element in this embodiment and is attached to the side of the bluff body 4 opposite the direction of flow.

In order to detect parasitic oscillations acting on the vortex flowmeter, an inertial sensor 7 for detecting these parasitic oscillations is additionally arranged in the embodiment according to FIG. 1a. According to FIG. 1a, the inertial sensor 7 is an acceleration sensor (accelerometer), which is sensitive in respect to three spatial axes (x, y, & x shown at the right side of the figure). The inertial sensor 7 is arranged on a board of the measuring and evaluating electronics 8 and is joined thereto.

Figure 1B:
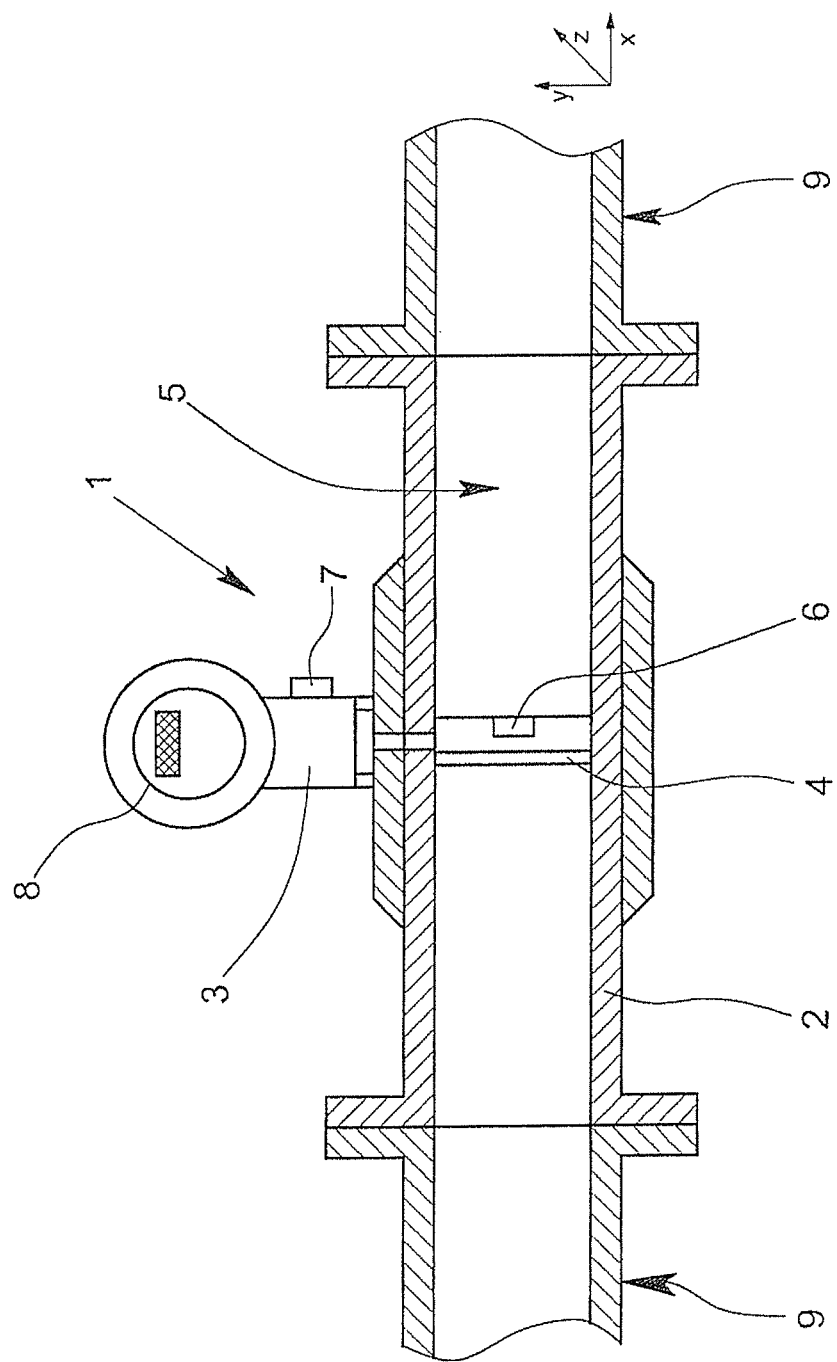
Figure 1C:
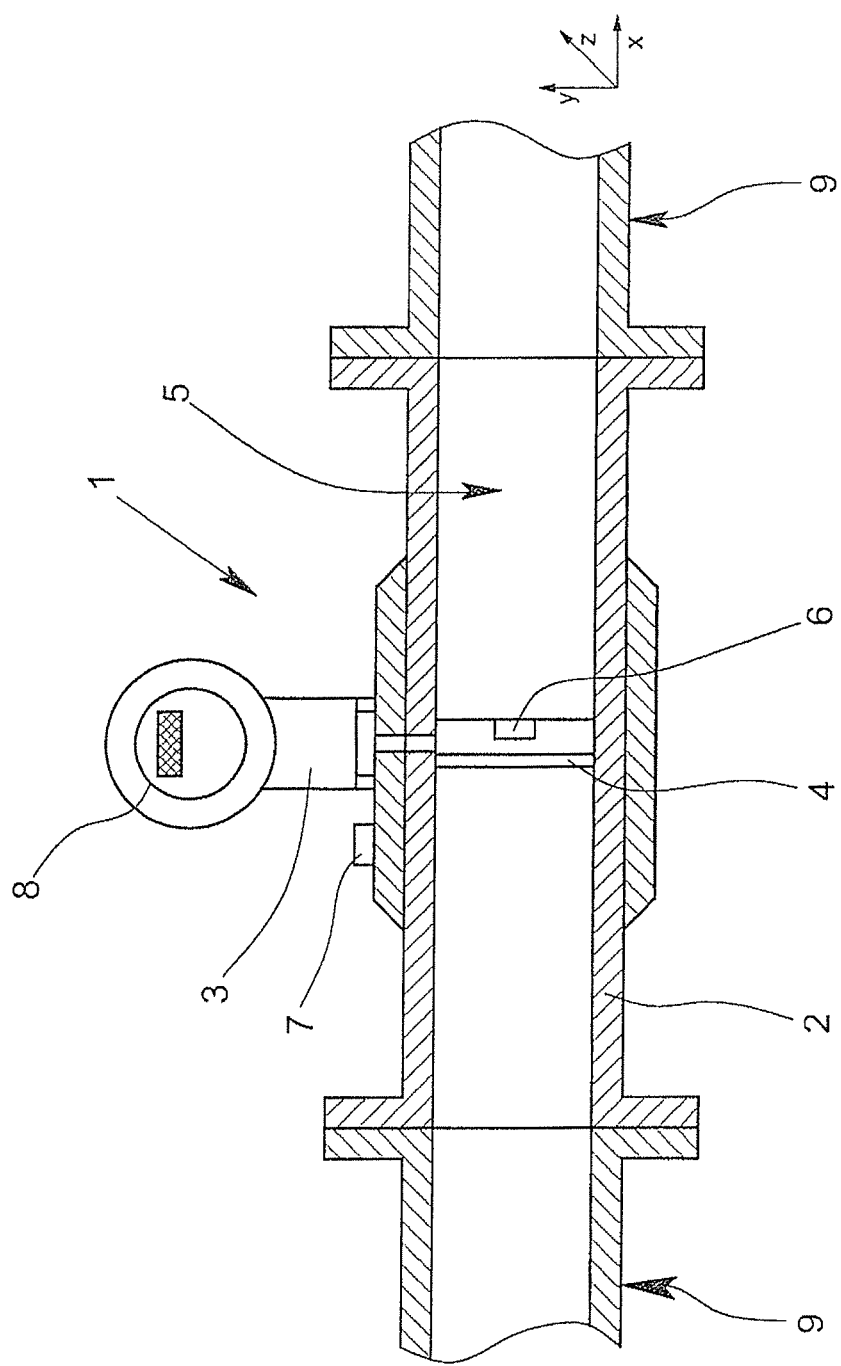
Figure 1D:
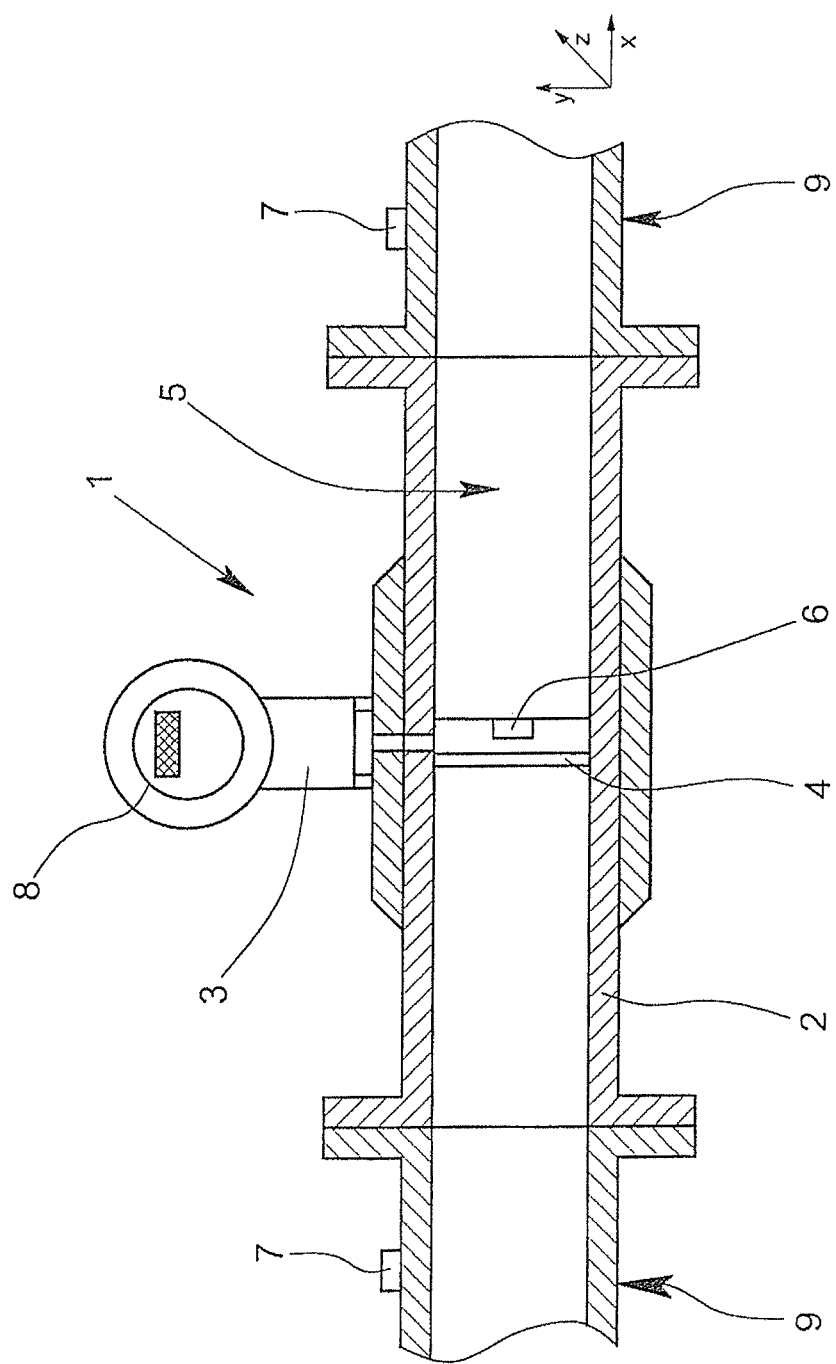

According to the embodiment in FIG. 1b, the inertial sensor 7 is attached to the housing 3 of the vortex flowmeter 1. In the embodiment according to FIG. 1c, the inertial sensor 7 is attached to the measuring tube 2 of the vortex flowmeter 1. In the embodiment according to FIG. 1d, two inertial sensors 7 are provided, one attached on the piping system 9 at each end of the vortex flowmeter 1.

The inertial sensors 7 are sensitive in respect to all three spatial axes in all four embodiments according to FIGS. 1a to 1d, so that a comprehensive evaluation of the parasitic oscillations acting on the vortex flowmeter 1 is possible. Furthermore, all of the inertial sensors 7 are joined to the measuring and evaluating electronics 8 of the vortex flowmeter 1, so that the measuring signals of the inertial sensors 7 can be evaluated there. Furthermore, the sensor unit 6 of the vortex flowmeter 1 is also always joined to the measuring and evaluating electronics 8 for transferring the measuring signal.

Figure 2:
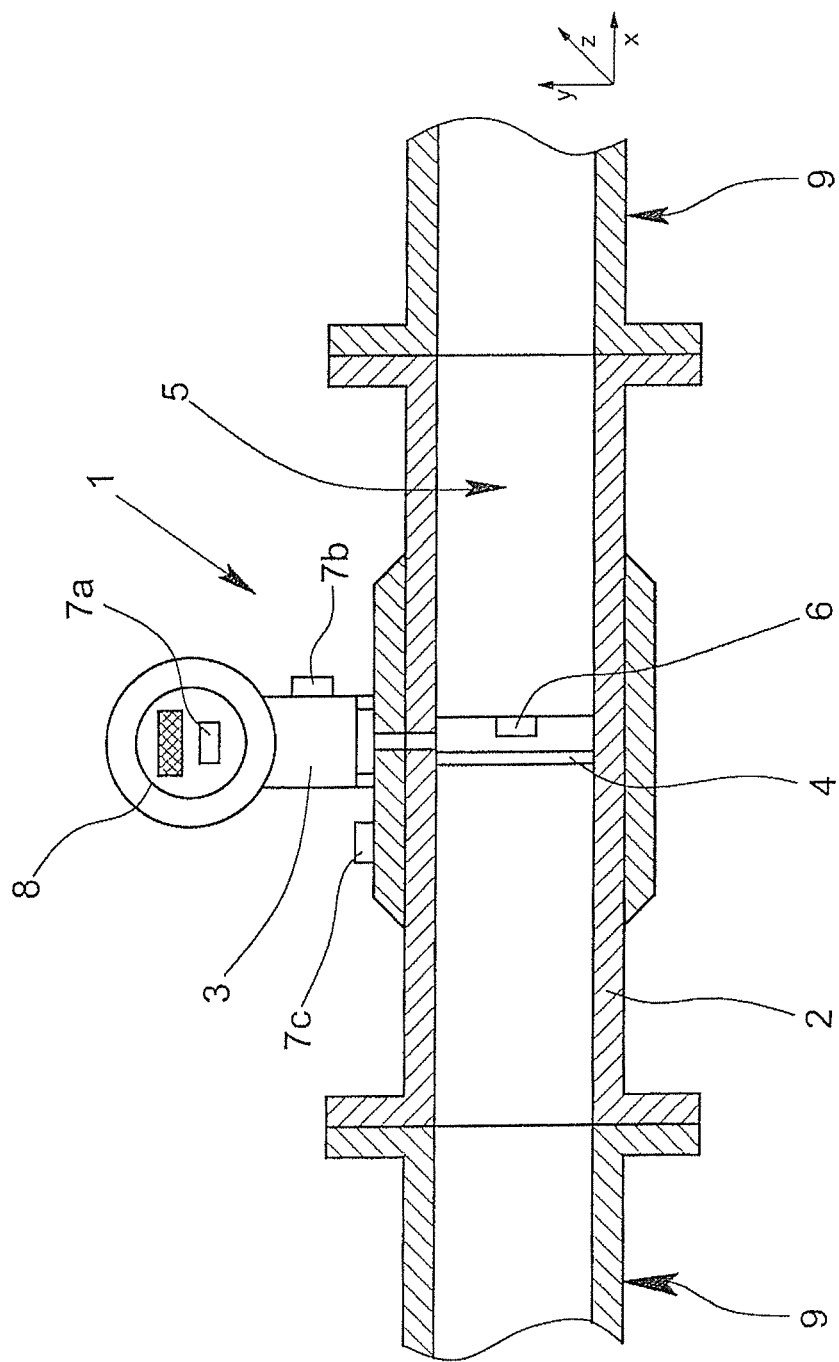
FIG. 2 is a sectional view of an embodiment of a flowmeter a flowmeter in accordance with the invention.

FIG. 2 shows an further embodiment of a vortex flowmeter 1 that essentially corresponds to the embodiments according to FIGS. 1a to 1d in respect to the basic design, wherein each of the three inertial sensors 7a, 7b, 7c is arranged at a respective one of three different positions on the vortex flowmeter 1. In this embodiment, a first inertial sensor 7a is located on a board of the measuring and evaluating electronics, a second inertial sensor 7b is located on the housing 3 and a third inertial sensor 7c is located on the measuring tube 2. The inertial sensors 7a, 7b, 7c are each sensitive to only one spatial direction, wherein the inertial sensor 7a is sensitive to the z-direction z, inertial sensor 7b to the y-direction y and inertial sensor 7c to the x-direction x. The measuring signals of the three inertial sensors 7a, 7b, 7c, are combined and evaluated together by the measuring and evaluating electronics 8. The separate arrangement of the sensors 7a, 7b, 7c, has the advantage that each of the inertial sensors 7a, 7b, 7c is arranged at a position that is optimal in respect to the detection of parasitic oscillations in its respective spatial direction.

Figure 3:
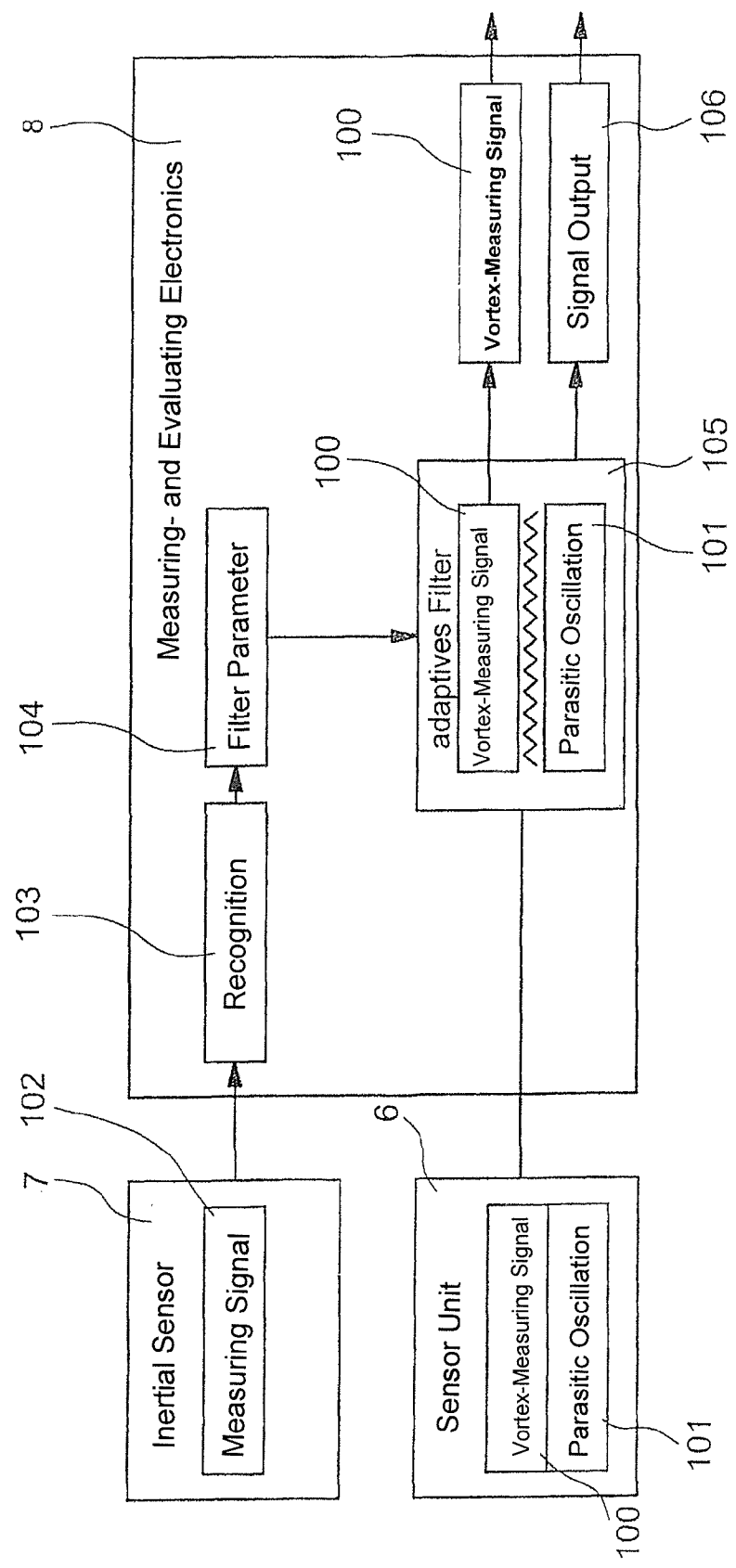
FIG. 3 is a flow chart of an embodiment of a method for operating a vortex flowmeter.

FIG. 3 shows a flow chart of an embodiment of a method for operating a vortex flowmeter according to the invention. The vortex measuring signal 100 is detected in overlap with the parasitic oscillation 101 by the sensor unit 6 during operation of the vortex flowmeter. Simultaneously, the inertial sensor 7 separately detects the measuring signal 102, which essentially conforms to the parasitic oscillation 101. After the measuring signals 102 have been detected by inertial sensor 7, recognition 103 of the type of parasitic oscillation 101 from the measuring signal 102 occurs so that, depending on the type of parasitic oscillation 101, the corresponding filter parameter 103 can be derived.

The filter parameters 104 serve to parameterize an adaptive filter 105 based on the measuring signals 102, and thus, the parasitic oscillations 101 obtained from the filter parameter 104, which separates the vortex measuring signal 100 from the parasitic oscillations 101 and then emits the corrected vortex measuring signal 100. The vortex measuring signals 100 are discarded or completely filtered out for parasitic oscillations 101 occurring short-term, so that, for example, only one signal output 106 is issued, which indicates that it is not possible to issue vortex measuring signals 100 due to the parasitic oscillations 101.

Figure 4:
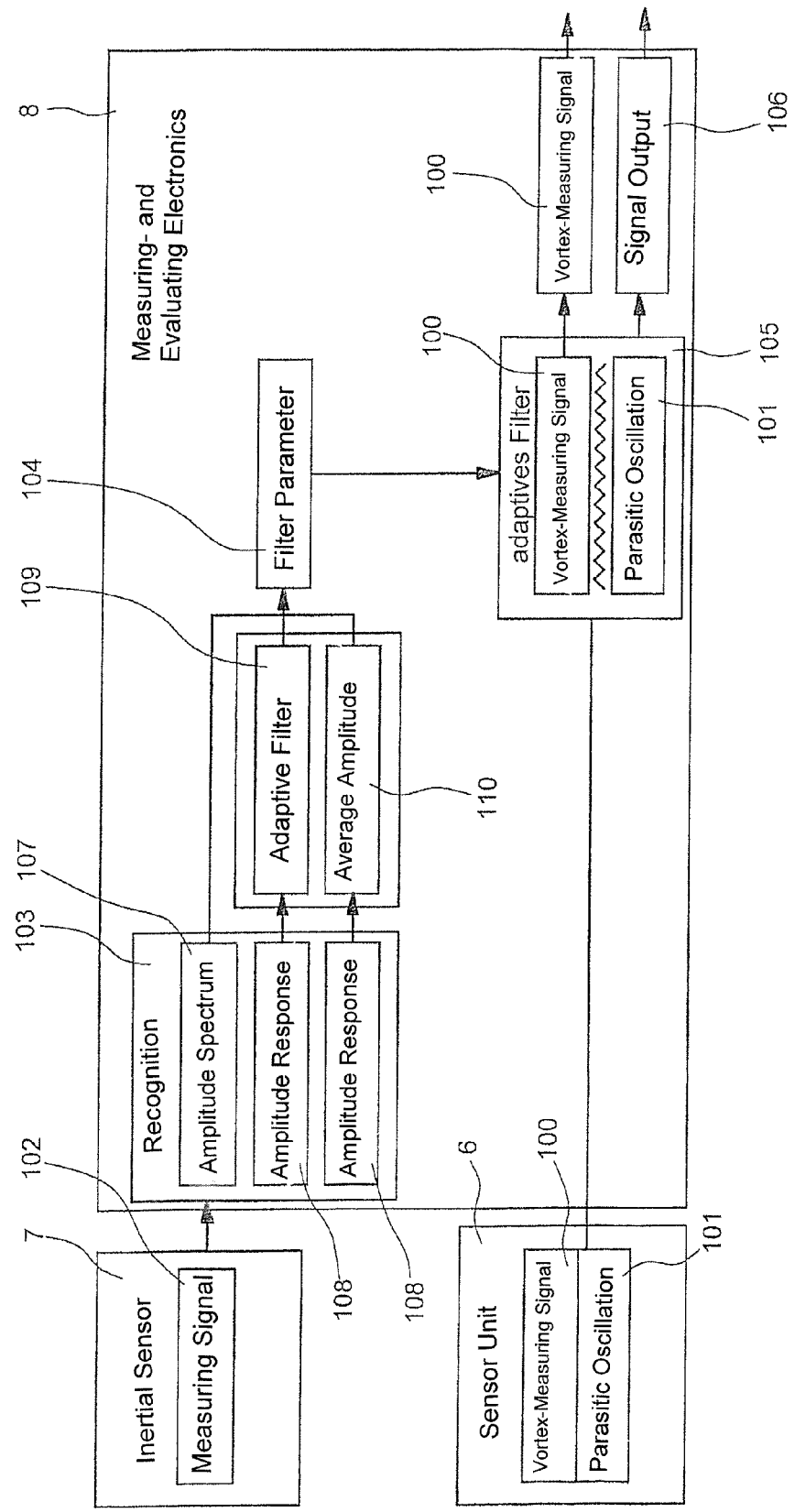
FIG. 4 is a flow chart of a further embodiment of a method for operating a vortex flowmeter.

The flow chart according to FIG. 4, which shows a further embodiment of a method for operating a vortex flowmeter according to the invention, essentially corresponds to the flow chart according to FIG. 3, wherein the recognition 103 is separated into at least two evaluation processes running simultaneously. On the one hand, an amplitude spectrum 107 of the measuring signal 102 detected by the inertial sensor 7 is formed, wherein filter parameters 104 are derived from the amplitude spectrum 107. In particular, the filter parameters 104 derived from the amplitude spectrum 107 are the corresponding filter frequencies for a notch filter, which is derived from the peaks occurring in the amplitude spectrum 107.

Furthermore, the amplitude response 108 of the measuring signals 102 detected by the inertial sensor 7 is formed. Then, the amplitude response 108 is differentiated, wherein the derivation 109 allows for the recognition of sudden changes of the measuring signal 102, and thus, the parasitic oscillations 101. If an erratic change of the measuring signal 102 is recognized from the derivation 108, for example, a corresponding filter parameter 104 is formed when a predetermined threshold value is exceeded by the derivation 109, which completely filters out the respective vortex measuring signals 100, as long as the derivation 109 exceeds the predetermined threshold value.

Furthermore, an average amplitude 110 is formed from the amplitude response 108 over a determinable amount of time. Insofar as the average amplitude 110 exceeds a predetermined threshold value or is subject to a substantial change, a further filter parameter 104 is derived from this, which preferably completely filters out the corresponding vortex measuring signal 100. When the vortex measuring signal 100 is completely filtered out, e.g., by a filter parameter determined from the derivation 109 or from the average amplitude 110, preferably a signal output 106 is also issued, which indicates that it is not possible to issue vortex measuring signals 11 at that point in time.

What is claimed is:

1. Vortex flowmeter comprising:
a measuring tube,
a housing,
a bluff body arranged in the measuring tube,
and a sensor unit arranged in the measuring tube at a location for producing a vortex measuring signal relating to vortexes caused by the bluff body,
wherein at least one inertial sensor is provided at a location for detecting parasitic oscillations acting on the vortex flowmeter, and
wherein the at least one inertial sensor is provided on a printed circuit board of measuring and evaluating electronics provided on the housing.

2. Vortex flowmeter comprising:
a measuring tube,
a housing,
a bluff body arranged in the measuring tube,
and a sensor unit arranged in the measuring tube at a location for producing a vortex measuring signal relating to vortexes caused by the bluff body,
wherein at least one inertial sensor is provided at a location for detecting parasitic oscillations acting on the vortex flowmeter, and
wherein the at least one inertial sensor is affixed to the housing.

3. Vortex flowmeter comprising:
a measuring tube,
a housing,
a bluff body arranged in the measuring tube,
and a sensor unit arranged in the measuring tube at a location for producing a vortex measuring signal relating to vortexes caused by the bluff body,
wherein at least one inertial sensor is provided at a location for detecting parasitic oscillations acting on the vortex flowmeter, and
wherein the at least one inertial sensor is affixed to the measuring tube.

4. Vortex flowmeter comprising:
a measuring tube,
a housing,
a bluff body arranged in the measuring tube,
a sensor unit arranged in the measuring tube at a location for producing a vortex measuring signal relating to vortexes caused by the bluff body, and
wherein a plurality of inertial sensors, for detecting parasitic oscillations acting on the vortex flowmeter,
wherein each of said inertial sensors is affixed at a different point on the vortex flowmeter, and
wherein each inertial sensor is only sensitive in respect to a respective spatial axis.

5. Method for operating a vortex flowmeter having a sensor device and at least one inertial sensor, comprising the steps of:
identifying parasitic oscillations acting on a vortex measuring signal of the vortex flowmeter by evaluating a measuring signal of the inertial sensor and
processing said vortex measuring signal of the sensor device at least partially controlled by the evaluated measuring signal of the inertial sensor,
wherein the vortex measuring signal is processed in an adaptive filter,
wherein an amplitude spectrum of the measuring signal of the inertial sensor is formed, and
wherein filter parameters for the adaptive filter are determined based on the amplitude spectrum.

6. Method according to claim 5, wherein peaks occurring in the amplitude spectrum are used as filter parameters for the adaptive filter.

7. Method for operating a vortex flowmeter having a sensor device and at least one inertial sensor, comprising the steps of:
identifying parasitic oscillations acting on a vortex measuring signal of the vortex flowmeter by evaluating a measuring signal of the inertial sensor and
processing said vortex measuring signal of the sensor device at least partially controlled by the evaluated measuring signal of the inertial sensor,
wherein the measuring signal of the inertial sensor is determined for evaluating an amplitude response.

8. Method according to claim 7, wherein the amplitude response is differentiated to identify sudden changes in the measuring signal of the inertial sensor.

9. Method according to claim 8, wherein the vortex measuring signals are discarded when the differentiated amplitude response reaches a predetermined threshold value.

10. Method according to claim 8, wherein a signal notification is generated when the differentiated amplitude response reaches a predetermined threshold value.

11. Method according to claim 7, and wherein an average amplitude is determined from the amplitude response over a flexible time frame.

12. Method according to claim 11, wherein a signal notification is generated when the average amplitude response reaches a predetermined threshold value.

13. Method according to claim 11, wherein the vortex measuring signals are discarded when the average amplitude reaches a predetermined threshold value.

* * * * *